Sept. 2, 1930. M. R. PIERCE Re. 17,790

CAMERA SEXTANT

Original Filed March 5, 1926 3 Sheets-Sheet 1

Inventor
Maurice R. Pierce
J. A. Klan
Attorney.

Sept. 2, 1930.

M. R. PIERCE

CAMERA SEXTANT

Re. 17,790

Original Filed March 5, 1926

3 Sheets-Sheet 2

Inventor

Maurice R. Pierce

P. A. Blair

Attorney.

Sept. 2, 1930.

M. R. PIERCE

CAMERA SEXTANT

Re. 17,790

Original Filed March 5, 1926

3 Sheets-Sheet 3

Inventor
Maurice R. Pierce
R. S. Blair
Attorney.

Reissued Sept. 2, 1930

Re. 17,790

UNITED STATES PATENT OFFICE

MAURICE R. PIERCE, OF THE UNITED STATES NAVY, LAKEHURST, NEW JERSEY

CAMERA SEXTANT

Original No. 1,653,585, dated December 20, 1927, Serial No. 92,655, filed March 5, 1926. Application for reissue filed September 6, 1928. Serial No. 304,343.

This invention relates to improvements in sextants, particularly adapted for use on aircraft where it becomes necessary to take readings from a celestial body and an artificial horizon at times when the natural horizon is not visible.

Before going into the details of the present invention it may be well to note that in taking altitude readings from the aircraft with various types of sextants now in use, the great difficulty has been experienced in that when concentrating on centering the horizon level, the image of the celestial body usually disappears from the finder, and when concentrating on bringing the image back to its proper position on the finder, the level is displaced, making it extremely difficult to obtain an accurate reading without great range of error.

It is, therefore, one of the objects of the present invention to overcome this difficulty and to make a permanent record with both objects appearing thereon in order that proper corrections may be made and an accurate determination obtained.

A further object is to provide a sextant of the above character, of simple and practical construction, whereby a photographic print or record may be easily and quickly procured.

A further object of the present invention is to provide an apparatus of the above character which may be conveniently operated, which will be of light and compact construction, and which may be inexpensively manufactured.

Other objects will be in part obvious and in part hereinafter pointed out in connection with the accompanying sheets of drawings illustrating two of various possible modifications and wherein similar reference characters denote corresponding parts. In these drawings, Fig. 1 is a diagrammatic view of a camera sextant, certain parts being broken away, certain parts, such as partitions being omitted, and certain other parts shown conventionally for clearness of illustration.

Figure 2:
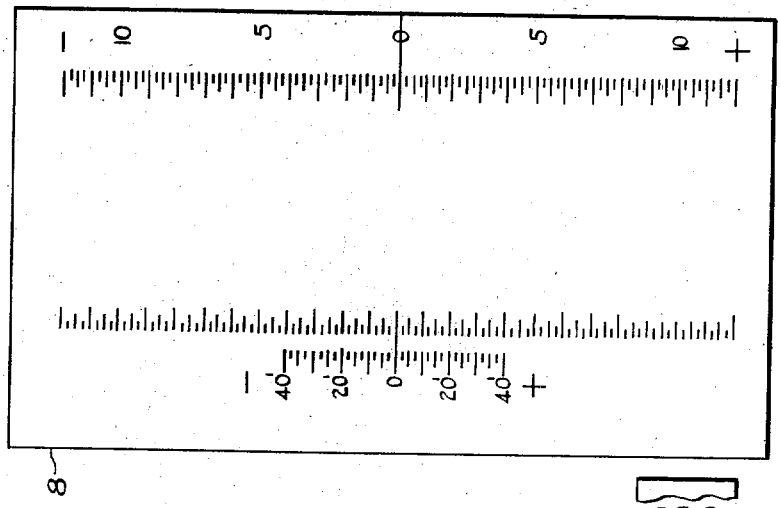
Figure 2 is an enlarged view of the grid used in the preferred form, showing combined grid and template, having the etched graduations and reference lines which are projected to the photographic print when the images are snapped.
Figure 1:
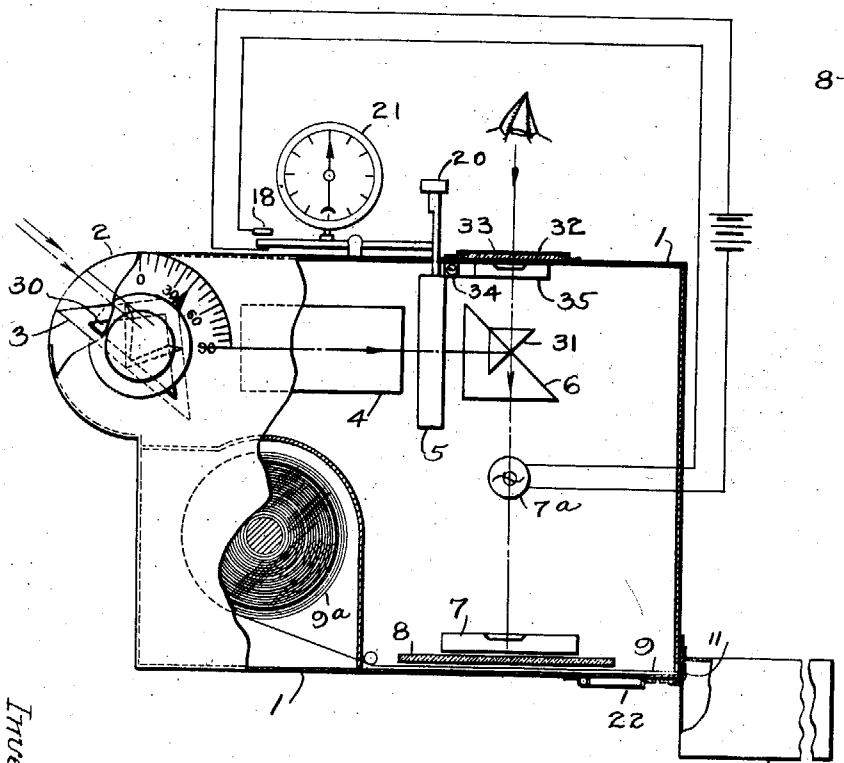

In the preferred form of this invention a true reading of altitude is obtained by roughly noting the angle of the setting of the prism lens, a positive correction reading from the horizontal image on the print and a positive correction reading from the celestial body image on the print. The horizon bubble image reading gives the true correction for not getting the sextant level, and the celestial body image reading gives the true correction for not centering in the finder sight.

The shadowgraph image, reference lines and graduations for reading the corrections are projected through the etched grid plate and the readings taken directly from the photographic print (direct in the preferred form).

In the modified form of this invention a true correction reading is obtained as before, by roughly noting the angle of the setting of the prism lens, by noting a positive correction reading from the horizon image, from the print, by placing an engraved transparent template over the print, and by reading the correction for true altitude from a celestial body.

The reason for having an alternative condition is due to the fact that where the image happens to be located directly under a reference line, a slight blur occurs. When the grid plate only contains the gauge lines a clear image is thus obtained on the photographic print, and the reading from the template graduations can be made more accurate.

With reference to the artifical horizon, it is to be understood that while the horizon bubble level has been shown as a means of illustration, it has been contemplated to use any other type of level gauge if preferred. A pendulum, gyro-compass or the like may be used without departing from the invention. By means of reflecting mirrors the images may be photographed in the same manner.

It is preferred, however, to use a liquid level to further reduce possible error and to save expense and weight in installation.

Referring to the drawing, the character 1 indicates a housing for inclosing the various parts having an opening 2 through which the image of the sun or other celestial body may pass, and it is understood that the casing includes conventional structural parts such as partitions and the like, for preventing clouding of the sensitized surfaces from foreign light sources. The image is reflected by a rotatably mounted prism 3 bearing a pointer that operates over graduations for indicating the angle of the setting of the prism, and then passes on through a lens 4. When the shutter 5 is operated, the rays pass on to a reflection prism 6 and are there reflected to a sensitized paper 9. The image of an artificial horizon indicator, or as illustrated, a bubble horizontal level 7, is also projected on the sensitized paper by the light rays reflected through the prism system. The intensity of the image of the artificial horizon indicator is increased by artificial illumination within the camera casing by any well known means such as an electric light $7^a$, that is automatically switched on at the instant the shutter is operated. The current for the light may be supplied from batteries housed in the casing, or from any outside source if preferred. It will therefore be seen that as the rays are projected through the etched grid plate 8, a shadowgraph image of the celestial body, horizon level image, reference lines, and graduations are recorded on the sensitized paper strip. This strip is fed from the roll $9^a$ in any well known manner, severed by a cutter 11, and stored in a transfer container 12. The exposed prints may be collected until the desired number of snap shots have been taken, and may then be developed in the usual manner.

A stop watch 21, and control switch 18 for the illuminating lamp are simultaneously controlled by the shutter operating button 20.

A window 22 is located at the bottom of the casing 1 for autographing the date, time, and angular setting of the prism lens on the back of the film for identification after developing.

Figure 4:
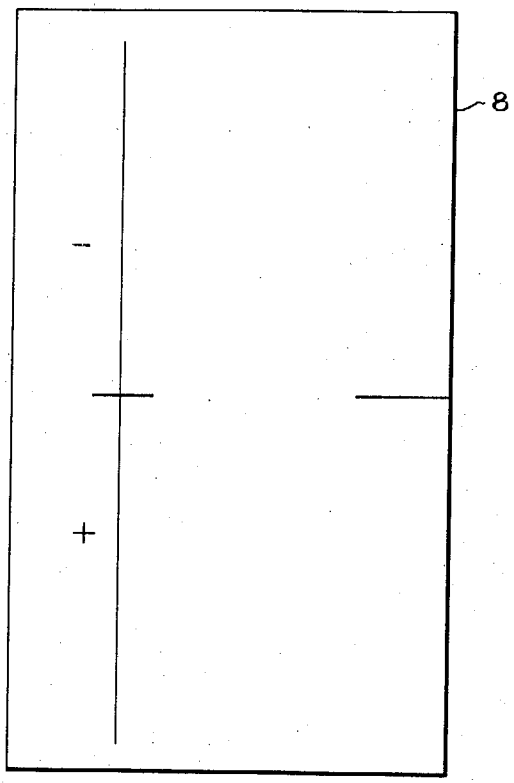
Figure 4 is an enlarged view of the grid used in the modified form, showing the reference lines which are projected to the photographic print when the images are snapped.
Figure 3:
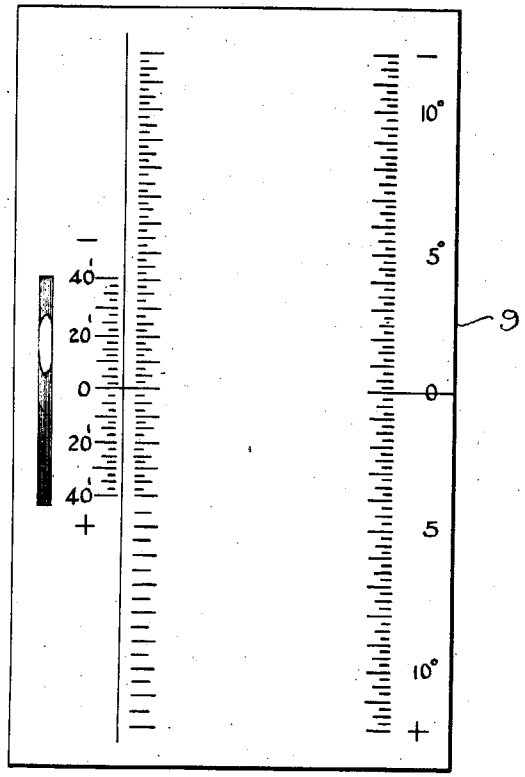
Figure 3 is a view of the exposed photographic print made with the preferred form, showing a position of the horizon bubble image, celestial body image, reference lines and graduations for a complete correction reading.
Figure 6:
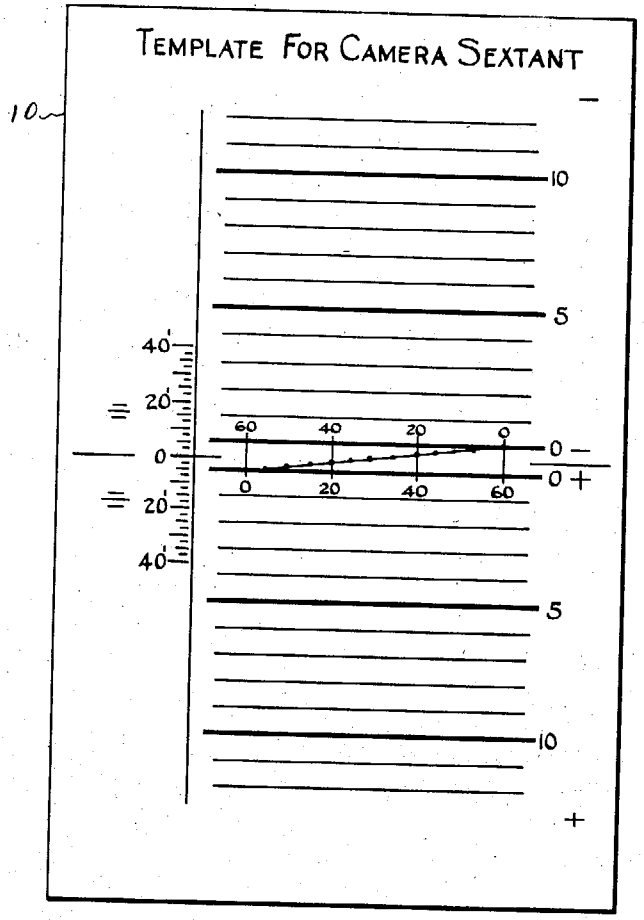
Figure 6 is a view of the template to be placed over the modified point shown in Figure 5, for taking readings for correction from the positions of the image.
Figure 5:
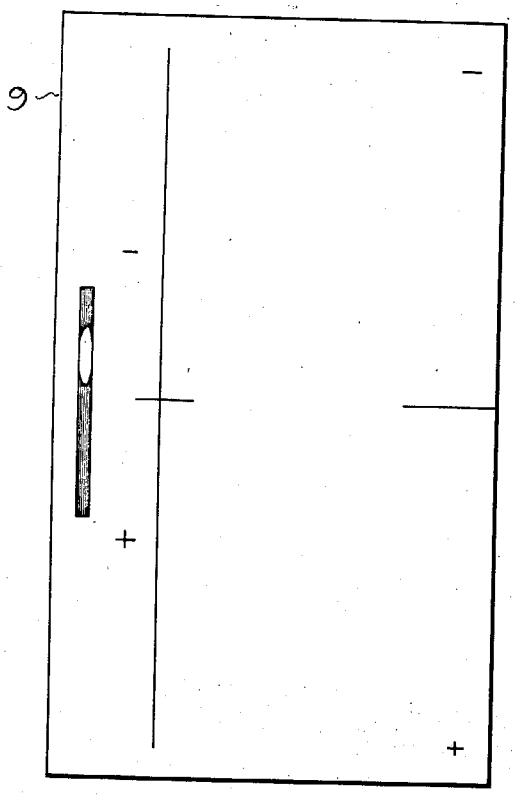
Figure 5 is a view of the exposed photographic print made with the modified form, showing a position of the horizon bubble image, celestial body image, and reference lines projected through the grid.

The grid plate 8 may contain all the graduations for determining the correction readings by projecting the same to the print, see Fig. 2, or may bear certain reference or base lines as indicated in Fig. 4. The scale etched to the left is for reading the bubble horizon correction, and represents a horizontal base line and the graduations of the scale indicate two and one-half minute intervals. The graduations to the right of the vertical reference line are used to determine the correction for the celestial image, and represent intervals of fifteen seconds.

When the grid and template are combined as in the preferred form, all graduations will appear on the print, and the readings are taken directly from the print, but when the grid plate only bears certain reference lines and the template bears the graduations, the print after being developed is placed on a flat surface, with the horizon image to the left, and the template moved about until one of the vertical lines on the print which was projected from the reference line on the grid, registers with the lines on the template and the horizon level image is centered under either of the two groups of three short parallel lines indicating + or −. The horizontal reference line on the print is used to read the true correction for not holding the sextant level. The template is then shifted to register the image of the celestial body on the print, under the diagonal line on the template, and the correction for not getting the celestial body centered in the finder is read from the reference line on the print either + or −.

The combined readings will then ascertain the true altitude reading from a celestial body.

It may be useful to remember that when the horizontal level image, and the image of a celestial body are above the reference or base line on print, the plate intervals are +.

In order to sight the instrument, two focal systems are necessary, one as previously described for recording the celestial image and the other to center the reflection of the celestial body in a finder.

Located at the opening 2 is a smaller prism 30 operated simultaneously by the same rotating and angle reading graduations as the prism 3. The prism 30 is located to one side of the path of the main lens focal system, so that the reflection of the celestial image is deflected by the prism 30 to a fixed prism 31 which directs the image to a finder 32 located on top of the sextant, in a convenient position to be sighted by the eye.

The finder 32 is shaded by a frosted glass 33 to soften the brightest reflections from the observer's eyes. The finder is also provided with bubble levels 34 and 35 for further aid in bringing the error of correction to a minimum by bringing the instrument to an approximately level position while making an exposure.

It is believed that the operation of the present device will be clear to those skilled in the art and after obtaining the desired print showing the relative location of the bubble image and the image of the celestial body with reference to certain guide markings the true corrections may be made and the problem easily and quickly solved.

The invention is, therefore, believed to accomplish, among others, all of the objects and advantages herein set forth.

What I claim is:—

1. A sextant camera including a casing provided with an opening for the admission of light to the interior of the casing, means normally excluding the light, prisms within the opening, other prisms within the casing on the opposite side of the shutter, a horizontal level, a grid, and means for supporting a sensitized paper for the reception of an image of a celestial body, an image of the horizon and an image of the grid when the shutter is opened.

2. A sextant camera including a casing, a finder, means for supporting a sensitized paper in the casing, a focal system for projecting the image of a body to the finder, a focal system for simultaneously projecting the said image to the sensitized paper, and a single means for excluding the image from both the finder and the paper.

3. A sextant camera including a casing, a finder, means for supporting a sensitized paper in the casing, adjustable prisms mounted in the wall of the casing, means for determining the angle of adjustment of the prisms, a plurality of fixed prisms within the casing for simultaneously deflecting the image projected by the adjustable prisms to the finder and sensitized paper, and means for normally excluding light from the casing interior.

4. In a sextant camera, the combination of a casing, having an opening therein, a plurality of rotatable prisms within the opening, a lens, a shutter, a plurality of fixed prisms within the casing and in alignment with the rotatable prisms and lens, a finder disposed at a point optically opposite one of the fixed prisms, and means disposed optically opposite the other of the fixed prisms for recording an image focused thereupon by the lens.

5. A sextant camera including a casing, a plurality of movable prisms, a lens, a shutter, a finder, a plurality of fixed prisms, an artificial horizon, a template, and means for simultaneous recording of an image of a body, the artificial horizon and the template.

6. A sextant camera including a casing provided with an opening, a prism at the opening, another prism within the casing, a shutter therebetween, a horizontal level, a grid, and means for supporting a sensitized member for the reception of an image of a celestial body, an image of the horizon and an image of the grid when the shutter is opened.

7. A sextant camera provided with a finder, means for supporting a sensitized member, a focal system for projecting the image of a distant body to the finder, a focal system for simultaneously projecting the said image to the sensitized member, and a control means for excluding the image from and exposing the image to the member.

8. A sextant camera including a casing, a finder, means for supporting a sensitized paper in the casing, adjustable prisms for receiving light from a distant body, means for determining the angle of adjustment of the prisms, and a plurality of fixed prisms within the casing for simultaneously deflecting the image projected by the adjustable prisms to the finder and to the sensitized paper.

9. In a sextant camera, the combination of a casing having an opening therein, a plurality of rotatable prisms within the opening, a plurality of fixed prisms within the casing and in alignment with the rotatable prisms, a finder disposed at a point optically opposite on of the fixed prisms, and means disposed optically opposite the other of the fixed prisms for recording an image received from the other of the fixed prisms.

10. A sextant camera including a casing, a movable prism for receiving light from a distant body, a fixed prism, an artificial horizon, a template, and means for simultaneous recording of an image of the body, the artificial horizon and the template.

11. A sextant camera provided with means forming an optic path, said means including a prism adapted to receive light from a distant body and change its direction as it enters the camera, means for indicating the angle of said change in direction of the light ray, means within the camera for directing the light along a fixed path, an artificial horizon and a grid disposed in said fixed path said grid having points of reference thereon and means for simultaneously recording of an image of said distant body, the artificial horizon and said points of reference from the grid.

12. In a sextant camera, the combination of means for locating a sensitized member in a plane of reference adapted to be tilted from the true horizon, optical means for photographically recording on the sensitized member the angle between said plane of reference and the true horizon, optical means for photographically recording on the sensitized member a correction to be applied to a preset, assumed angle between a distant body and said plane of reference, a time indicator and a control for simultaneously causing said two optical means and said time indicator to function simultaneously.

13. In a sextant camera the combination of a locating device supporting a sensitized member in a plane of reference adapted to be tilted with the camera from a horizontal plane, means for photographically recording on the sensitized member the angle between said plane of reference and the horizontal plane, and means functioning simultaneously with the first mentioned means for photographically recording on the sensitized member a correction to be applied to an assumed angular value approximating the angle formed between a distant body and said plane of reference at the instant the recording is made.

14. In a sextant camera the combination of means for supporting a sensitized member in a plane of reference, means forming an artificial horizon, a grid provided with two lines of graduations parallel to each other and spaced apart in one direction from a zero line, said artificial horizon means and said grid coacting to position the image of said horizon at said zero point when said plane of reference is fixed relative to the true horizon, and positioning the image of the horizon along one of said lines of graduations and spaced from the zero point distances proportionate to the angles between the true horizon and said plane of reference, and means for positioning on said sensitized member and in juxtaposition to the other line of graduations an image of a distant body.

15. In a sextant camera, the combination of means defining a plane of reference adapted to be tilted at an angle to the true horizon, means for directing a light ray from a distant body on to said plane, means for recording the angle between said plane and said true horizon, means for recording the angle between said plane and the portion of the light ray impinging on the same, and control means for causing both of said recording means to function simultaneously.

16. In a sextant camera, the combination of means defining a plane of reference adapted to be tilted at an angle to the true horizon, means for directing a light ray from a distant body on to said plane, means for recording the angle between said plane and said true horizon, means for recording the angle between said plane and the portion of the light ray impinging on the same, and control means for causing both of said recording means to function simultaneously, said light directing means including a light deflecting means and means for indicating the angle at which said deflecting means changes the direction of the light from the distant body.

17. In a camera sextant, the combination of a casing, a time indicator carried by the casing and visible to the operator, an inclinometer contained within the casing and visible to the operator, and manually actuated means carried by the casing for simultaneously indicating the time and for recording an image of the reading of said contained inclinometer.

18. In a device of the class described, the combination of a shiftable camera sextant provided with a casing having sighting means adapted to be trained on a distant body, manually adjustable means including a scale graduated in angular degrees carried by the casing for indicating approximately the angle between the horizontal and a line determined by the training of said sighting means on the distant body, an inclinometer housed within the casing for indicating a correction to be applied algebraically to said approximately indicated angle, and means for photographically recording the readings of the inclinometer.

19. A camera sextant provided with means for sighting a distant body, means including a lens provided with a manually adjustable scale and pointer and a correcting inclinometer and associated scale collectively indicating the angle of altitude of said body, a time indicator, means for photographically recording an image of the inclinometer and its scale, and a single control for causing said time indicator to indicate the exact time at which the photographic means functioned.

20. In a device for observing by direct visual examination and for recording certain reading relating to the angular variation from the horizontal of a distant body, the combination of a support adapted to be held substantially in a horizontal position and to be moved manually in training the device on the distant body, sighting means for viewing the distant body, carried by the support and movable therewith, photographic means carried by the support, means for indicating the angle between the true horizon and the line of sight through said sighting means, said indicating means including graduated scales and coacting indicators visible to the operator and certain readings of said indicating means being exposed to said photographic means.

21. A device for indicating the angular variation from the horizontal of a distant body, comprising a casing, sighting means carried thereby and movable therewith for viewing the distant body, means for indicating approximately the said angular variation, and means for recording the angle of correction between the reading of said approximate angular indicating means and the true angular variation of the distant body from the horizontal.

22. In a device for recording the angle of elevation or depression from the horizontal of a distant body, the combination of a casing, sighting means carried by the casing and movable therewith for viewing the distant body, a spirit level housed within the casing, a scale graduated in degrees coacting with the spirit level for indicating the angle in which the casing is shifted from a normal position, sighting means for viewing the spirit level from a position exteriorly of the casing, means within the casing for illuminating the spirit level, means for photographing the spirit level and its scale and a manually actuated control for said photographing means.

23. In a device for recording the angle of elevation or depression from the horizontal of a distant body, the combination of a casing, sighting means carried by the casing and movable therewith for viewing the distant body, an inclinometer support adapted to be moved with the casing, an inclinometer mounted on the support for indicating the angular variation of said support from the position which it assumes when the casing is in its normal horizontal position with the sighting means directed to a distant body in the horizontal plane containing the device and means for photographically recording the reading of angular variations as indicated by said inclinometer.

24. In a device of the class described, the combination of an enclosed casing adapted to be tilted from a normal horizontal position about a horizontal axis when in use, sighting means adapted to be trained on a distant body, a spirit level contained within the casing, a graduated scale coacting with the spirit level to indicate angular variations of the casing from its normal horizontal position, a source of light contained within the casing for illuminating the spirit level and its scale and manually controlled means for photographically recording the illuminated spirit level and scale whereby a photograph of the spirit level reading may be made at the instant of time when the distant body is visible through the sighting means.

25. In a camera sextant, the combination of a casing including means providing a plane of reference which may be tilted in tilting the camera from a horizontal, sighting means adapted to be trained on a distant body, means for indicating the angle between said plane of reference and the line of sight leading to the distant body, corrective means comprising an inclinometer and associated scale graduated in degrees carried by the casing indicating automatically the angle between said plane of reference and the horizontal and means for photographically recording the reading of said inclinometer and its scale.

26. In a device of the class described, the combination of a casing which is liable to be shifted from its normal horizontal position while in use, sighting means carried thereby and adapted to be trained on a distant body, means for indicating the angle in a vertical plane between a line passing through the distant body and any arbitrarily selected plane of reference shifted with the camera from its normal horizontal, means for indicating the angle between said selected plane of reference and the true horizontal, and means for photographically recording said last named indications.

27. A celestial surveying device comprising sighting means adapted to be trained on a celestial body, instruments for supplying time and other data necessary for making celestial observations, said instruments including a time indicator for registering any instant of time at which the instrument is caused to function, an inclinometer controlled automatically by a shifting of said sighting means in space, means for photographically and instantly recording the readings of certain of said instruments and a manually actuated control for causing said device to function at will and whereby the operator can automatically obtain the requisite data by actuating the control at the instant he sees the distant body through the sighting means.

28. In a camera sextant for use in celestial geometry, the combination of a casing adapted to be disposed in an approximately level position while making an exposure, manually controlled sighting means carried by the casing, and adapted to be trained on a celestial body, means for indicating the altitude angle of said body including an inclinometer and associated scale contained within the casing, means for photographing the readings of said inclinometer on the scale, a time indicator carried by the casing and visible to the operator using said sighting means and a manually actuated control carried by the casing operatively connected to said indicator and to said photographing means to cause the same to function simultaneously whereby the operator may obtain a record of the altitude angle and the time at which the observation was made at the instant the light from the celestial body is seen in the sighting means.

29. In a camera sextant for recording an altitude observation of a distant body and for indicating the time at which the observation is made, the combination of an enclosed casing adapted to be disposed in position defining a horizontal plane of reference, sighting means carried by the casing, movable therewith and adapted to be trained on a distant body, an inclinometer including an indicator and its associated scale mounted within the casing, said scale having a horizontal base line and graduations in degrees extending from one side of the base line, said inclinometer and its scale being associated so that the indicator of the inclinometer will be at the horizontal base line position on the scale when the casing is disposed in position to define said horizontal plane and indicating in degree readings on the scale the inclination of the casing from said horizontal plane defining position, said casing provided with an opening exposing the inclinometer so that it is visible to the operator, a time indicator carried by the casing and visible to the operator, means carried within the casing for photographically recording the readings of the inclinometer on the scale and control means adapted to be actuated by the operator at the instant the sighting means are trained on distant body, with incidental inclination of the casing as a whole, for causing the last named means to function.

30. In a camera sextant, the combination of an enclosed casing, sighting means movable with the casing and adapted to be trained on a distant body the altitude angle of which is desired, and acting to direct the light from said distant body through the casing to the eye of the operator, a manually controlled angle meter adapted to be preset to indicate approximately the altitude angle of said distant body when viewed through the sighting means with the casing approximately in its normal horizontal position, an inclinometer and an associated scale housed within the casing for indicating the inclination of the casing from said normal horizontal position, means within the camera for illuminating said inclinometer and its scale, means for photographically recording the readings of said illuminated inclinometer and scale and a manually actuated control for effecting the functioning of said recording means whereby the operator may obtain a permanent record of the variations to be added algebraically to the preset readings of the angle meter necessitated by any inclination of the casing at the instant the observation was taken thereby to obtain the true altitude angle of the distant body irrespective of any displacement of the casing from its intended horizontal position.

Signed at New York in the county of New York and State of New York, this 23rd day of August, A. D. 1928.

MAURICE R. PIERCE.